US006888475B2

(12) United States Patent
Darr (10) Patent No.: US 6,888,475 B2
(45) Date of Patent: May 3, 2005

(54) CONTROL SYSTEM FOR AIRCRAFT SEAT BELT ARRANGEMENT

(76) Inventor: Joshua Scott Darr, 5517 Nortonville Rd., Nortonville, KY (US) 42442

( * ) Notice: Subject to any disclaimer, the term of this patent is extended or adjusted under 35 U.S.C. 154(b) by 0 days.

(21) Appl. No.: 10/302,224

(22) Filed: Nov. 22, 2002

(65) Prior Publication Data

US 2003/0160497 A1 Aug. 28, 2003

Related U.S. Application Data (60) Provisional application No. 60/346,833, filed on Jan. 10, 2002.

(51) Int. Cl.[7] .............................................. G08B 21/00
(52) U.S. Cl. ............... 340/945; 340/425.15; 340/457.1; 340/438; 340/667; 340/5.1; 340/5.22; 340/5.23; 280/801.1; 280/805; 280/806; 180/268
(58) Field of Search ........................... 340/945, 426.15, 340/457.1, 439, 667, 5.1, 5.22, 5.23, 433; 280/801.1, 805, 806; 180/268; 438/117

(56) References Cited

U.S. PATENT DOCUMENTS

| 3,841,328 | A | * | 10/1974 | Jensen ........................ 604/135 |
| 3,875,556 | A | * | 4/1975 | Beaird ....................... 340/457.1 |
| 4,432,119 | A | * | 2/1984 | Schwark et al. .............. 24/603 |
| 4,553,625 | A | * | 11/1985 | Tsuge et al. ................ 180/268 |
| 4,691,939 | A | * | 9/1987 | Sato ........................... 280/806 |
| 5,311,302 | A | * | 5/1994 | Berry et al. ............. 348/14.03 |
| 5,520,263 | A | * | 5/1996 | Suran et al. ................. 180/270 |
| 6,215,395 | B1 | * | 4/2001 | Slaughter et al. ........ 340/457.1 |
| 6,362,734 | B1 | * | 3/2002 | McQuade et al. ....... 340/457.1 |
| 6,448,907 | B1 | * | 9/2002 | Naclerio ..................... 340/945 |
| 2002/0196274 | A1 | * | 12/2002 | Comfort et al. ............ 345/741 |
| 2003/0098194 | A1 | * | 5/2003 | Roddy ........................ 180/270 |

OTHER PUBLICATIONS

Web pages entitled "Child Proof Seat Belt Guard" from www.childproofseatbelt.com.
Web pages entitled "Buckle Boss Belt Guard" from www.buckleboss.com.

* cited by examiner

Primary Examiner—Tai T. Nguyen
(74) Attorney, Agent, or Firm—Fay Sharpe Fagan Minnich & McKee; Robert V. Vickers; Karl W. Hauber (57) ABSTRACT

Provided is a method and control system for a plurality of passenger seat belt mechanisms for appropriately securing and protecting passengers. The control system enables the flight crew to monitor and remotely control the locking and unlocking of passenger seat restraint mechanisms, thereby controlling the number of passengers, at any given time, having access to the aircraft cabin during flight. This control system is provided with a mechanism for collectively and selectively locking and unlocking the seat restraint mechanisms. The control system is capable of detecting and signaling the current state of a seat restraint mechanism.

31 Claims, 7 Drawing Sheets

CONTROL SYSTEM FOR AIRCRAFT SEAT BELT ARRANGEMENT

This patent application claims priority on Provisional Patent Application No. 60/346,833, filed Jan. 10, 2002.

The present invention relates to an improved method and system for aircraft seat belt arrangements for collectively and selectively locking and unlocking occupant seat belt mechanisms, and more particularly, to a control system that enables the flight crew to monitor and control the number of passengers having access to the aircraft cabin during flight.

INCORPORATION BY REFERENCE

Midorikawa, U.S. Pat. No. 6,332,629; and Midorikawa, U.S. Pat. No. 6,184,785 are incorporated by reference for background information relating to seat belt devices with locking retractors, a controller for rotating a motor for retracting and protracting the seat belt webbing, and a detector for detecting the existence of a passenger.

BACKGROUND OF THE INVENTION

Generally, commercial aircraft use a conventional seat belt restraint mechanism which restrains the passenger in the seat. The current method for restraining passengers is a participatory process in which passengers are told when to latch seat belts by the flight attendants. Passengers also receive auditory and visual signals when to latch seat belts, i.e. during takeoff and during landing. Additionally, passengers are told when they can release their seat belt mechanism by the same aforementioned means. The current procedure, in being a participatory method, does not allow the flight attendants and/or pilots to be alerted as to which passengers are not restrained by their respective seat belt mechanism and/or when such restraint is compromised. With the current seat belt arrangement, passengers can lock and unlock their seat belts at will, which allows access to the plane cabin at all times. The typical seat belt mechanisms used by the airlines include a male tongue plate portion which is inserted into the female buckle portion of the seat belt mechanism. Once the connection is made, the free end of the webbing strap which is generally secured to the female buckle end can be pulled to remove the slack. These seat belt mechanisms are of the lap belt variety. The resulting tension, or lack thereof, placed on the webbing strap is a function of each passenger's discretion. Once the male tongue plate and female buckle members of the mechanism have been connected and the tension of the webbing strap tightened across the passenger's lap, the passenger is then restrained in the seat.

When the passenger wishes to release the seat belt mechanism, a release handle on the female buckle section is lifted, thereby disengaging the tongue plate portion and releasing the male seat belt connection from the female section. This releasing operation can be conducted by a passenger or passengers at any time, and at will, during take-off, in flight, or during or upon landing of the aircraft. Therefore, current seat belt systems used by airlines do not provide any security against, for example, a potential hijacker or hijackers and/or any other disruptive or disorderly passenger or passengers. The seat belt mechanism is merely an optional safety measure by which, if used, passengers are restrained by the lap belt during periods of turbulence, take-off, landing, and prior to impending accidents or other emergency situations. Additionally, the flight crew has no way other than by visual observation of ascertaining whether any one or all of the passengers have fastened their seat belts. In this respect, the current systems involve the flight crew walking up and down the cabin aisle conducting a visual inspection of each passenger and his or her respective seat belt. This inspection does not ensure compliance, because once the flight attendant has passed any row in which a passenger is seated, the passenger can release the seat belt mechanism thereby enabling his or her access to the airplane cabin. Additionally, airplane seat belt systems currently lack any capability of involuntarily restraining an unruly or potentially dangerous passenger.

SUMMARY OF THE INVENTION

In accordance with the present invention, a seat belt control system is provided for use in airplanes which optimizes the security of the airplane and safety of passengers against the disruptive action of a passenger or passengers in the cabin of the plane. In this respect, a control mechanism or system is provided which includes one or more control consoles in the aircraft which allow the flight crew to selectively control the locking and unlocking of any one or more seat belts at any given time. The flight crew's control includes the ability to unlock all seat belts in case of an emergency, or when otherwise desired, such as during unboarding. Consoles, in the form of touch screen interfaces, for example, can be placed in the cockpit, as well as in the flight attendants' compartment or compartments, whereby pilots and/or flight attendants have the ability to selectively lock and unlock passengers' restraint belts one by one or several at a time, as desired. The control system maintains a status display on the touch screen for monitoring the current state of each of the seat belt mechanisms. In this respect, the display updates and alerts the flight crew regarding which seat belts are latched/locked, latched/unlocked, and/or unlatched/unlocked. The control system also accommodates maintaining one or more seat belts permanently in an unlocked state for a sky marshall or other security personnel. Advantageously, the control system enables the flight crew to control the number of passengers who are out of their seats at any given time during the flight. The system takes into account passenger needs to get up during the course of the flight and, in this respect, includes an attendant call button that alerts the flight attendant that a passenger is requesting to be released from his or her seat and consequently, desires that the restraint belt be unlocked. Attendant call buttons are standard features on most large commercial aircraft. Of considerable advantage is the fact that a control system according to the invention allows or enables the flight crew to cause the restraint of an unruly passenger or passengers without the requirement of the flight crew or other passengers having to physically restrain the passengers.

The seat belt control system of the present invention involves the use of specially designed electronically controlled lap or seat belts and the installation of a network-like system which provides for remote control of the electronic lap or seat belts. Preferably, the seat belts comprise a self-tightening webbing wound around a reel for protracting and retracting the webbing either in a lap and shoulder arrangement or in a lap only arrangement. The control system involves an arrangement which preferably is comprised of an electromagnetic mechanism for operating the seat belts, selectively, in latched/locked and latched/unlocked states which maintain the seat belt arrangement in respectively secured and unsecured states to restrain an occupant. Further, the control system detects and signals, such as through audio and/or visual alarms, when a passenger manually unlatches a latched/unlocked seat belt, whereby the occupant becomes unrestrained. Additionally, the control system detects and signals, through audio and/or visual alarms, when a passenger has latched the seat belt subsequent to the passenger returning to the seat. The seat belts are configured in such a manner that only the associated male and female ends for each respective seat can be properly latched.

The control system further includes a processing unit which distributes a control signal from the pilot or flight attendants' interface, to a router which then decodes the signal and decides which seat it is being sent to. If the control signal is a release signal, the router then passes the information to the designated lock, allowing the lock to release. The locks are operated much like a light switch. When the power is on, the lock is secure, and when the power is off, the lock is released and the seat belt can be manually unlatched. If a power loss or other system failure occurs, then all seat belt mechanisms are automatically and simultaneously unlocked. The automatic unlocking of the seat belt mechanisms, while maintaining restraint of a passenger, allows manual unlatching and prevents passengers from becoming trapped in the event of a power loss or other emergency. It will be appreciated that the control system has other applications for other modes of travel, i.e. trains, buses, etc.

It is the principal object of the invention to provide a seat belt control system for airplanes, wherein one or more control consoles accessible only to the flight crew are used to control the locking and unlocking of the seat belts.

It is another object of the invention to provide a system of the foregoing character whereby the number of passengers having access to the airplane cabin at any given time can be controlled.

It is yet a further object of the invention to provide a control system of the foregoing character whereby the flight crew can lock or unlock all seat belts selectively and individually or simultaneously.

It is still a further object of the invention to provide a control system of the foregoing character whereby the flight crew is alerted as to which seat belts are in an unsecured state and which seat belts are in a secured state.

It is yet another object of the invention to provide a control system of the foregoing character whereby one or more seat belts are maintained in an unlocked state.

It is still another object of the invention to provide a control system of the foregoing character whereby the system detects and signals the flight crew when a passenger manually unlatches or latches an unlocked seat belt.

It is a further object of the invention to provide a control system of the foregoing character wherein only the associated male and female adjoining ends for each respective seat belt can be properly latched.

BRIEF DESCRIPTION OF THE DRAWINGS

The foregoing objects, and others, will in part be obvious and in part pointed out more fully hereinafter in conjunction with the description of a preferred embodiment shown in the accompanying drawings in which.

DESCRIPTION OF A PREFERRED EMBODIMENT

According to the present invention as embodied and described herein, a method and system for detecting the condition of and controlling the locking and unlocking of aircraft seat belt mechanisms is provided. While a system and method for controlling aircraft seat belt arrangements is described, it will be appreciated that the technology described herein may also be applied to the control of seat belts used in conjunction with other modes of travel, i.e. trains, buses, etc.

Figure 1:
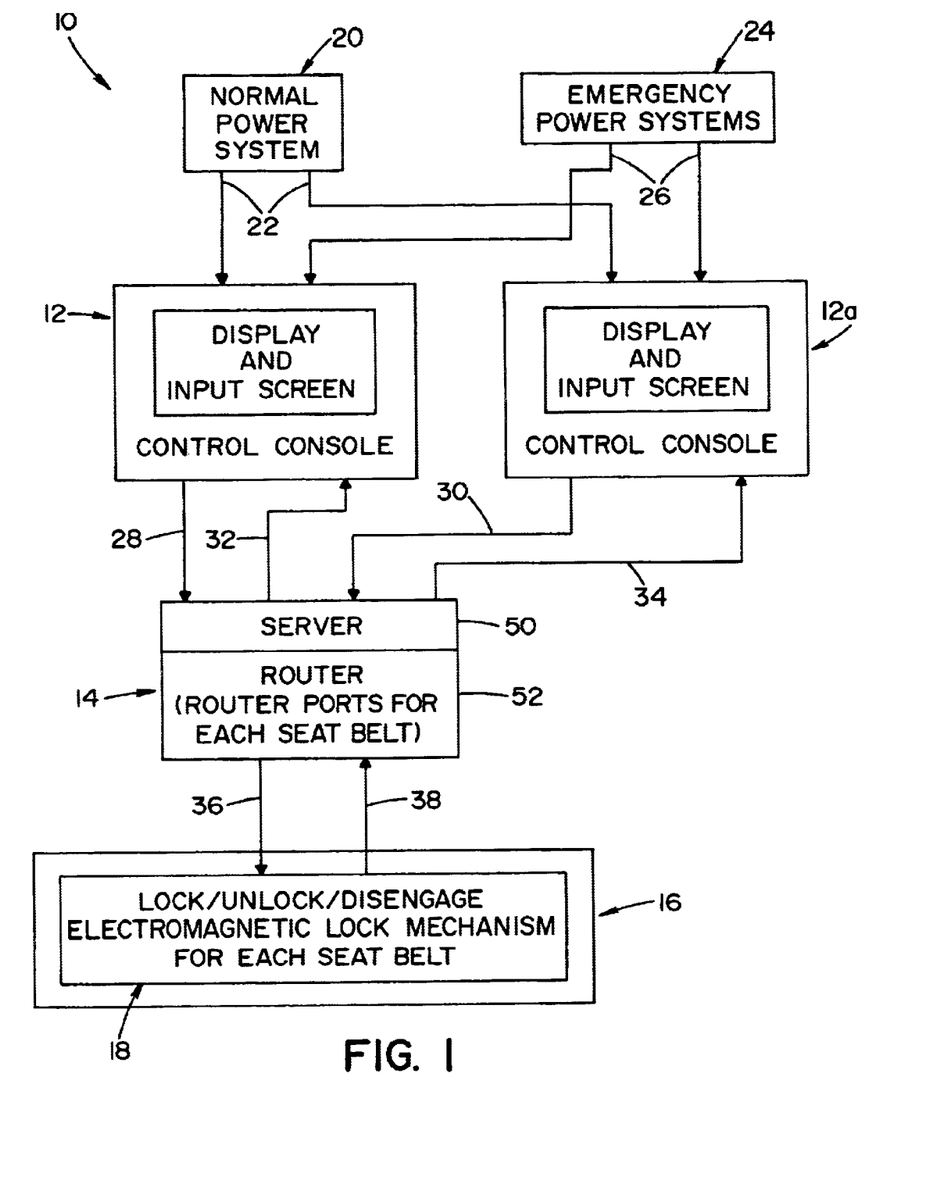
FIG. 1 is a block diagram of the components of a seat belt control system according to the invention.
Figure 1A:
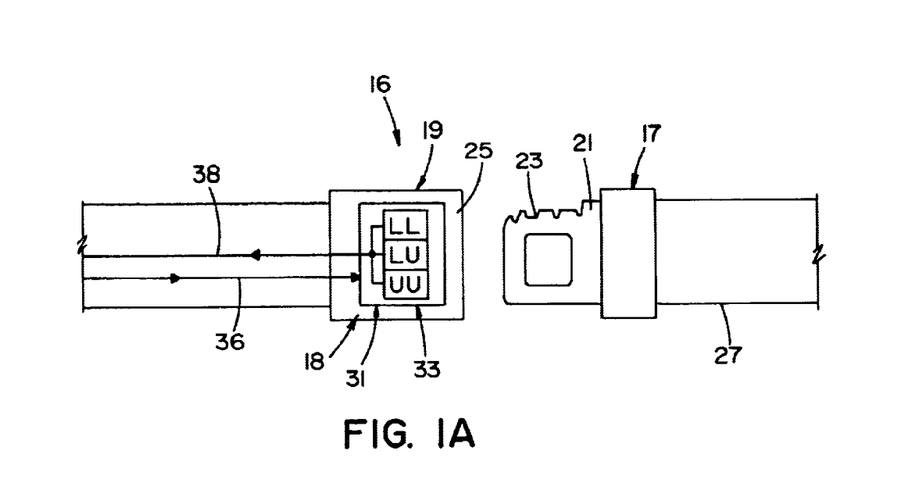
FIG. 1A illustrates the associated male and female adjoining ends of a seat belt.

FIG. 1 shows a control system 10 having at least one and preferably at least two identical control consoles 12 and 12a, a common processor 14, and a seat belt or seat restraint 16 including an electromagnetic lock mechanism 18 for locking and unlocking seat belt 16 as set forth more fully hereinafter. It will be appreciated, of course, that seat belt unit 16 is one of a plurality of such units, each of which is electronically connected to the consoles through processor 14 as described herein with regard to unit 16. The consoles 12 and 12a are preferably powered by the aircraft's power supply 20 through lines 22, and, in the event of a power failure thereof, they are powered by the aircraft's emergency power supply 24 through lines 26. It will be appreciated, however, that a power supply separate from those of the aircraft could be employed. When the plane's power supply is used, the control system 10 is preferably connected thereto through a switch, not shown, controlled, for example, by the pilot. Consoles 12 and 12a are, for example, respectively located in the cockpit and flight attendant station of the aircraft and are adapted to send control signals to processor 14 through lines 28 and 30, respectively, and to respectively receive control signals therefrom through lines 32 and 34. Processor 14 is programmed to output control signals to lock mechanism 18 of seat belt 16 through line 36 in response to and corresponding to a particular control signal outputted from one of the consoles as set forth more fully hereinafter. Further, processor 14 receives a seat belt condition signal from the lock mechanism through line 38 and is programmed to display the corresponding condition of the seat belt on the display screen of the console. More particularly with regard to these functions, lock mechanism 18 includes an actuator 31 and a detector 33 mounted in female component 19. Actuator 31 alternately switches the lock mechanism between a locked and unlocked position in accordance with a control signal received through line 38 from controller 14, and detector 33 detects one of three possible conditions of the seat belt, namely, latched and locked LL, latched and unlocked LU, or unlatched (unlocked) UU, and outputs a control signal corresponding to the detected condition through line 38 to controller 14. One embodiment of a suitable seat belt mechanism 16 is shown in FIG. 1A. In this embodiment, the male component 17, which is configured to be received by the female component 19, includes a tongue plate 21 which is notched or otherwise key coded as indicated by numeral 23 to allow engagement of the tongue plate exclusively with buckle 25 of the corresponding female component 19. Alternatively, the tongue plate 21 can be sized accordingly to only allow engagement with respective buckle 25 of corresponding female portion 19. Once tongue plate 21 engages buckle 25, the slack in webbing strap 27 is removed by the self-tightening webbing strap reel, not shown.

Figure 2:
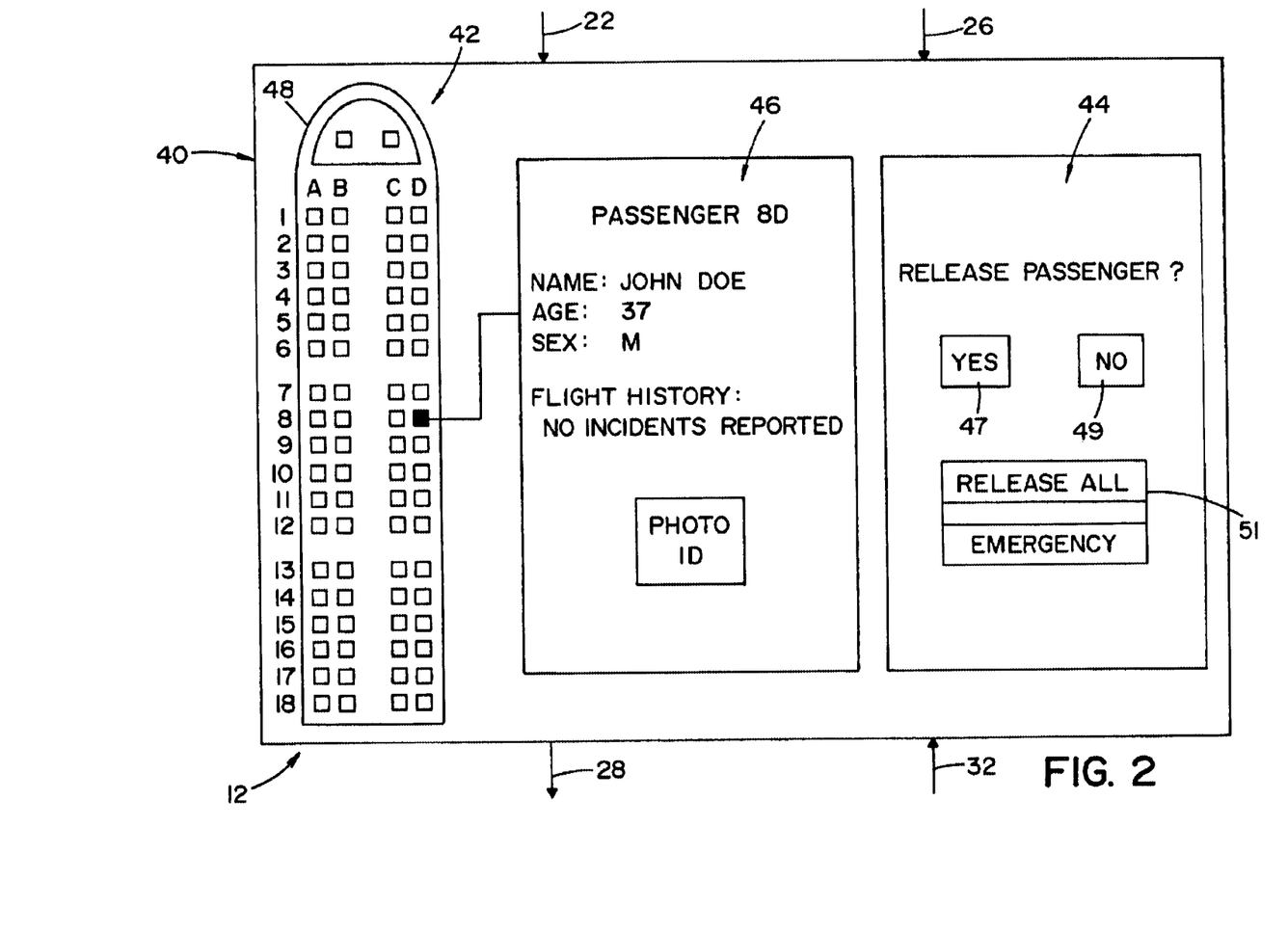
FIG. 2 illustrates an example of an input and display screen portion of a control console component of the control system; and, FIGS. 3A–3D depict a flow diagram of the operation of the control system of the present invention.

As best seen in FIG. 2 with regard to control console 12, the console includes a display and input screen 40, which is preferably a touch screen. Screen 40 includes an input touch screen area 42 corresponding to the seat layout in the cabin of the aircraft, a seat belt touch screen control portion 44 by which a crew member can control seat belt conditions as set forth hereinafter, and, preferably, a passenger identification portion 46 responsive to a request signal inputted to area 42 as set forth hereinafter to visually display passenger profile information for viewing by a crew member. More particularly with regard to screen 40, input portion 42 includes a seating display 48 for the aircraft, each seat area of which, when touched, preferably activates portion 46 to visually identify the passenger in the corresponding seat. Moreover, touching the seat area arms control portion 44 so that the pilot, co-pilot, or other crew member or flight attendant having access to the console can touch the appropriate one of the "YES" area 47 and "NO" area 49 to output a control signal through line 28 to processor 14. In the example in FIG. 2, seat 8D has been identified. Processor 14 is programmed to maintain "RELEASE ALL" area 51 of console 12 armed at all times whereby, in the event of an emergency, or at the time for unboarding, the pilot can touch the "RELEASE ALL" area 51, whereupon all the seat belts are released immediately and simultaneously. Processor 14 includes a server 50 which receives the control signals from the control consoles 12 and 12a, and a router 52 which decodes the signal with respect to identifying the seat belt 16 to be controlled based on the seat location, and outputs the selected "YES" or "NO" signal to the selected seat belt through line 36. Thus, it will be appreciated that router 52 has an output line 36 and input lines 38 for each seat belt in the aircraft.

As will be appreciated from the description hereinabove, when components 17 and 19 of seat belt 16 are connected, detector 33 outputs a signal through line 38 to processor 14 which is one of two possible condition signals, namely, latched and locked LL or latched and unlocked LU. When the seat belt components are disconnected, or unlatched U, detector 33 outputs a signal through line 38 which is indicative of this condition. The condition of each seat belt 16 is displayed in seating display area 48 of consoles 12 and 12a, such as by a green light for latched and locked LL, a red light for latched and unlocked LU, and an amber light when the belt is unlocked and unlatched UU. In the latched and unlocked LU condition, the passenger can unlatch seat belt 16, at which time detector 33 would output a signal indicative of the new condition, whereby the red light would go off and the amber light would come on to visually indicate the action taken by the passenger. A passenger wishing to be released can activate the call light (not illustrated) for an attendant, and in response, the pilot or attendant can touch the corresponding seat area in display portion 48 to activate identification portion 46 regarding the passenger in the seat and to arm control portion 44. Depending upon the status of flight and the number of other passengers unsecured, or other factors known to the flight crew, the pilot or flight attendant can make the appropriate decision with regard to releasing the seat belt 16 and then touch the corresponding one of the "YES" and "NO" areas in control portion 44.

Figure 3A:
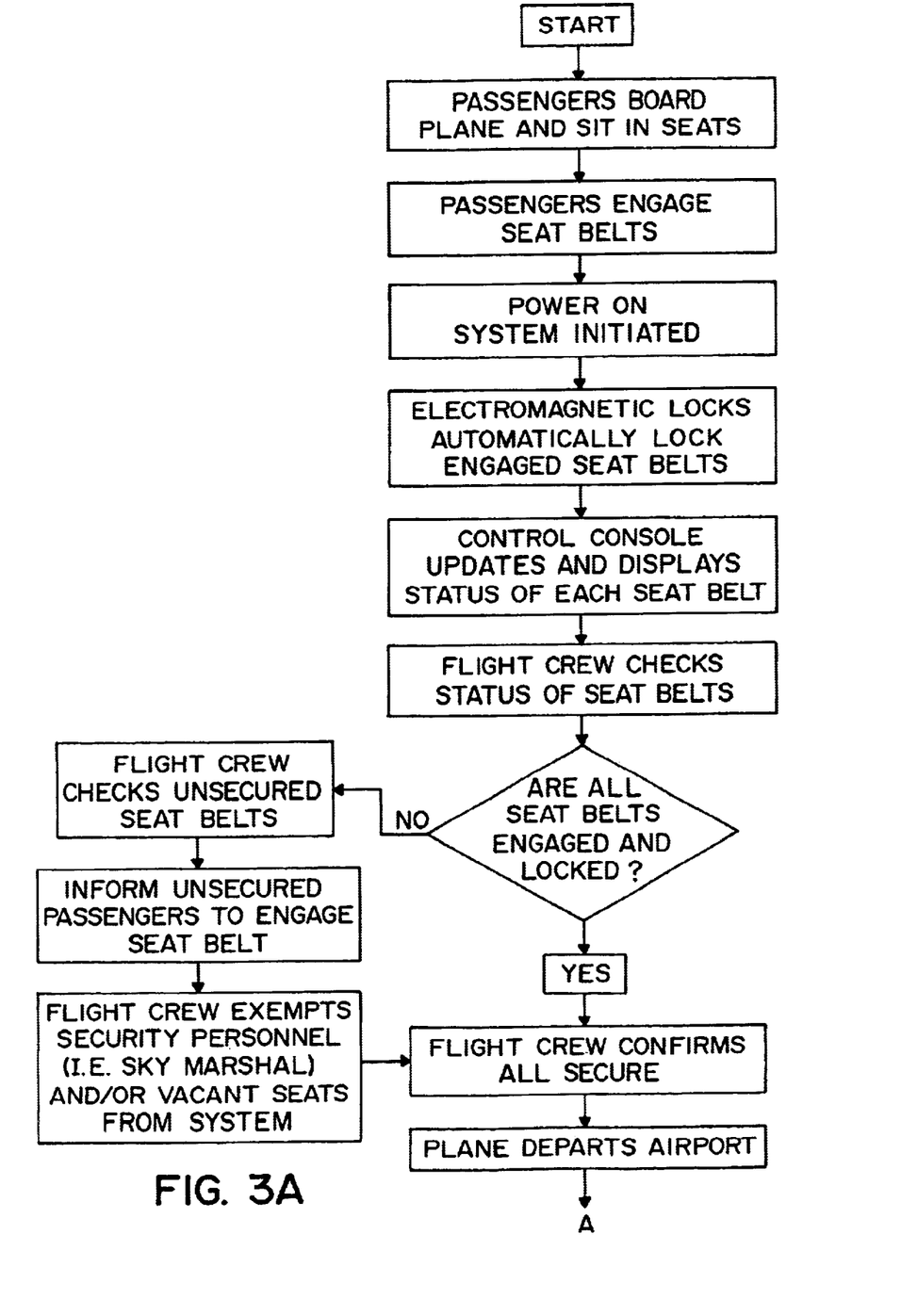

The steps in operating control system 10 are displayed in the flow chart of FIGS. 3A-3D, and the method generally follows the steps identified in the flow chart as hereinafter described. With reference first to FIG. 3A, the passengers board the plane and progress to their respective seats. If passenger identification portion 46 is included in the system, the passengers sit in assigned seats corresponding to ticket information. Once the passengers have positioned themselves in their respective seats, they latch their seat belts. Seat belts, as described above, are configured in such a manner that only the associated male and female ends for each respective seat can be latched. Once all passengers have taken their respective seats and latched their seat belts, operation of system is initiated, such as by the pilot closing a switch to the plane's power supply, whereby power is supplied to consoles, processor, and lock mechanisms. Electromagnetic locks automatically lock the latched seat belts upon connecting the system to the power supply, and the control consoles update and display the status of each seat belt on the aircraft in area 48. Assuming that a flight attendant is responsible for operating the system, he or she checks the status of all of the seat belts on screen portion 48 and visually determines whether all of the seat belts are latched and locked. If there are some unlatched and/or unlocked seat belts, the flight crew checks these unsecured seat belts and the unsecured passengers are informed to latch their seat belts. In connection with this check, the flight crew exempts security personnel such as sky marshalls and/or vacant seats from the control system. If all of the required seat belts are latched, or become latched upon instructions from the flight crew, the flight attendant confirms the same and clears the aircraft for departure. The plane then will taxi and take off from the airport via normal operating procedures.

Figure 3B:
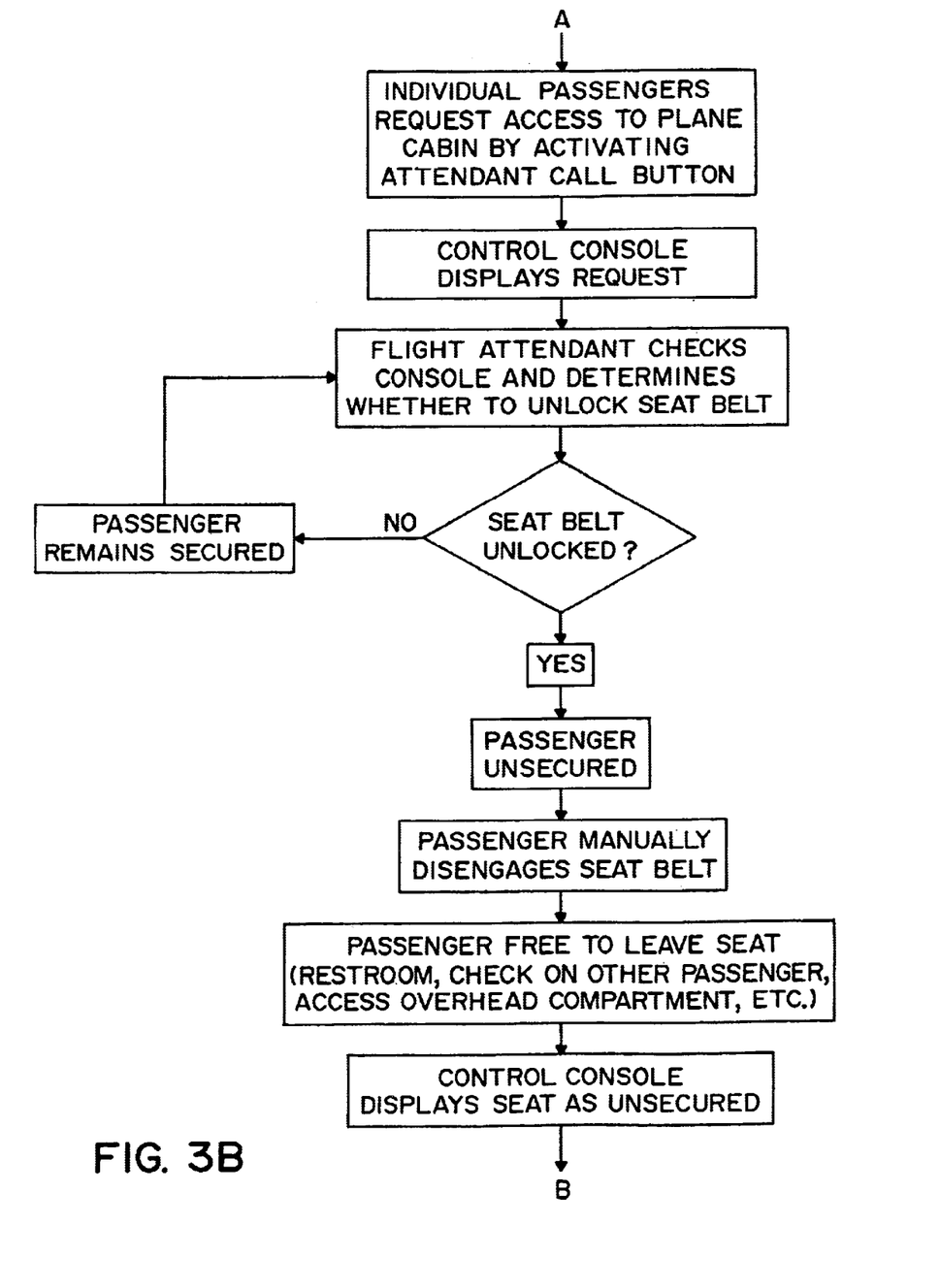
Figure 3C:
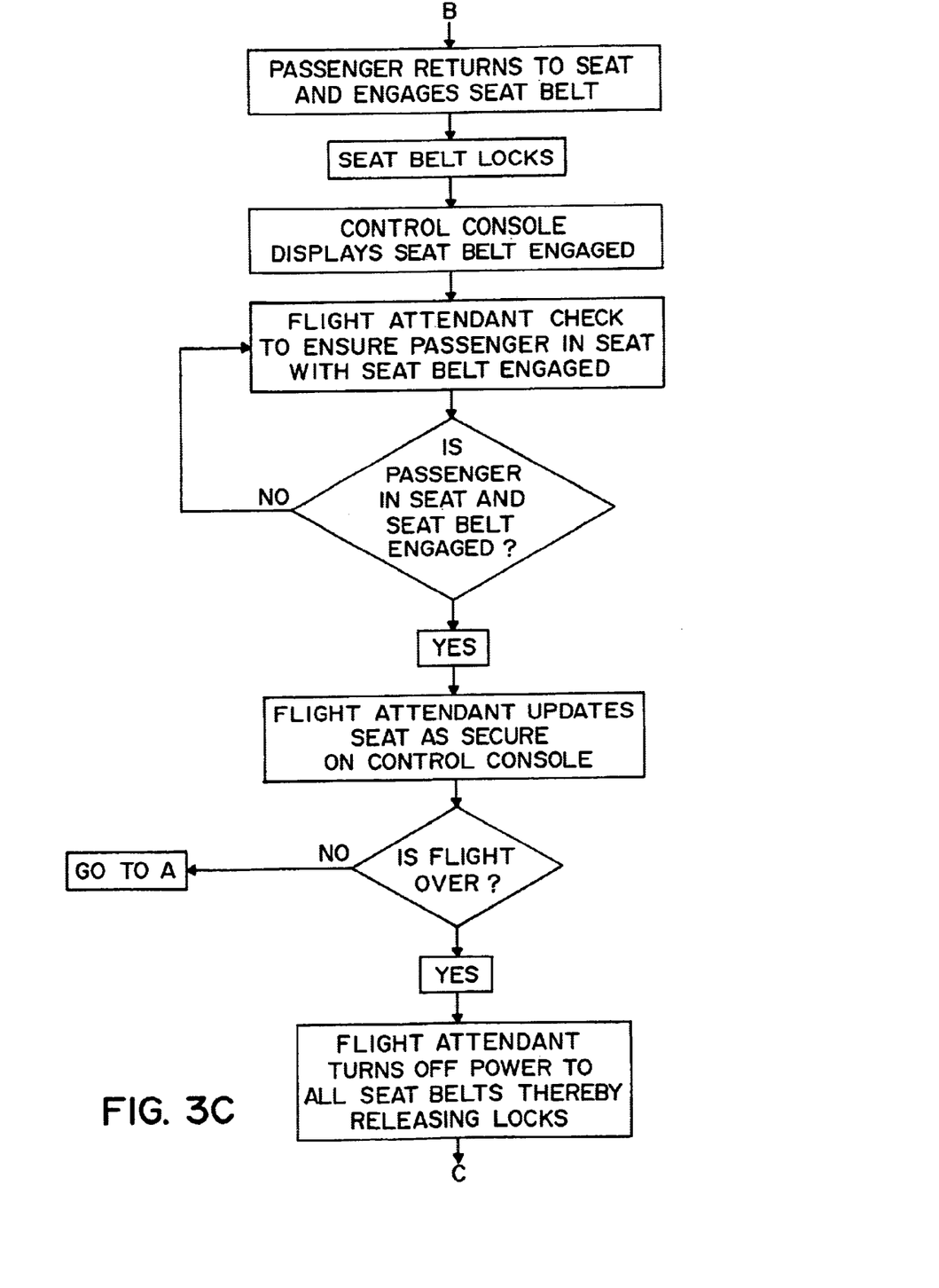
Figure 3D:
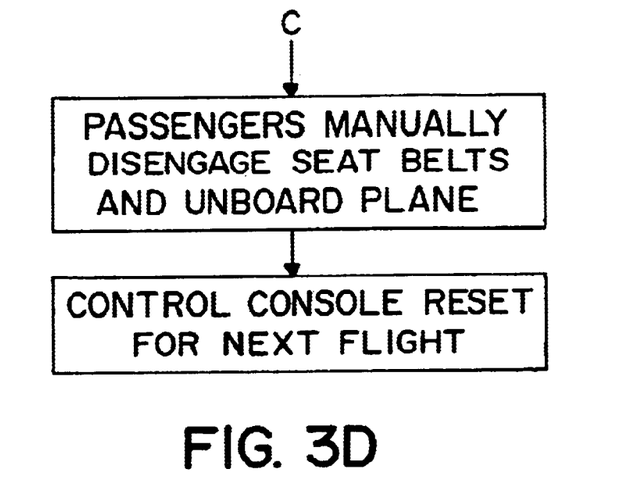

As indicated by the portion of the flow chart in FIG. 3B, once the aircraft is airborne, individual passengers may request access to the plane cabin by activating their attendant call button. The control consoles display the passenger request, such as by blinking of the seat light in screen area 48. The flight attendant then checks the console and determines whether or not to activate the lock mechanism which unlocks the seat belt of that individual. If the flight attendant determines not to unlock the seat belt, the passenger remains secured. Otherwise, the seat belt is unlocked and the change in condition showing the seat belt to be latched and unlocked, whereby the passenger is unsecured, is displayed in seating display area 48 of the flight attendant's console. Once the passenger manually unlatches the seat belt, the passenger is free to leave his or her seat and proceed to a rest room, check on other passenger, access overhead compartment, and the control console displays the seat belt as unsecured. As shown in the portion of the flow chart in FIG. 3C, when the passenger returns to his or her seat and latches the seat belt, the belt locks and the control consoles are updated, whereby the display shows the respective seat belt to be latched. The flight attendant at some point, or repeatedly if necessary, checks to ensure that the passenger is in his or her seat, and has the seat belt latched. When the passenger is in the seat with the seat belt latched, the flight attendant locks the belt by touching NO in area 44 of the console, and thus updates the current state of the seat belt as latched and locked and thus secure. This procedure continues until the flight has ended. Once the flight has ended and the aircraft has landed and reached its predetermined destination, the flight attendant either turns off power to the control system or touches the RELEASE ALL area of the console, whereby all seat belts are unlocked. Passengers are then able to manually unlatch their seat belts and are free to leave their seats and unboard the plane as shown in the portion of the flow chart in FIG. 3D. The control system is then reset for the next flight.

The invention has been described with reference to several embodiments. Obviously, modifications and alterations will occur to others upon a reading and understanding of this specification. It is intended to include all such modifications and alterations insofar as they come within the scope of the appended claims and the equivalents thereof.

Having thus described the invention, it is claimed:

1. A control system for a plurality of passenger seat belt mechanisms comprising:
    a control console;
    detection means for signaling a current state of each seatbelt mechanism, said detection means including an electrically activated lock in said seat belt mechanism and means for sending a signal to said control console indicative of said current state of said seat belt mechanism,
    means at said console for indicating said current state of said seat belt mechanism;
    switching means at said console for selectively locking and unlocking said lock; and,
    said current state of said seat belt mechanism being one of a first latched and locked state, a second latched and unlocked state, and a third unlatched and unlocked state.

2. A control system according to claim 1, wherein said console includes means for selectively identifying any one of said plurality of seat belt mechanisms.

3. A control system according to claim 1, wherein said switching means includes means for simultaneously selectively locking and unlocking all of said plurality of seat belt mechanisms.

4. A control system according to claim 1, wherein said seat belt mechanism includes a male and a female restraint portion, said male and female seat restraint portions of the associated seat belt mechanism being keyed to only latch with each other.

5. A control system for a plurality of passenger seat belt mechanisms comprising:
    a control console;
    means at said console for indicating a current state of said seat belt mechanism;
    switching means at said console for selectively locking and unlocking an electrically activated lock in said seat belt mechanism; and,
    said current state of said seat belt mechanism being one of a first latched and locked state, a second latched and unlocked state, and a third unlatched and unlocked state.

6. A control system according to claim 5, wherein said console includes means for selectively identifying any one of said plurality of seat belt mechanisms.

7. A control system according to claim 5, wherein said switching means includes means for simultaneously selectively locking and unlocking all of said plurality of seat belt mechanisms.

8. A control system according to claim 5, wherein said seat belt mechanism includes a male and a female restraint portion, said male and female seat restraint portions of an associated seat belt mechanism being keyed to only latch with each other.

9. A control system for a plurality of passenger seat belt mechanisms comprising:
    a control console;
    detection means for signaling a current state of each seat belt mechanism, said detection means including an electrically activated lock in said seat belt mechanism and means for sending a signal to said control console indicative of said current state of said seat belt mechanism;
    means at said console for indicating said current state of said seat belt mechanism; and,
    said current state of said seat belt mechanism being one of a first latched and locked state, a second latched and unlocked state, and a third unlatched and unlocked state.

10. A control system for a plurality of passenger seat belt mechanisms comprising:
    a control console;
    detection means for signaling a current state of each seat belt mechanism, said detection means including an electronically activated lock in said seat belt mechanism and means for sending a signal to said control console indicative of said current state of said seat belt mechanism;
    means at said console for indicating said current state of said seat belt mechanism; and,
    switching means at said console for selectively locking and unlocking said lock.

11. A control system according to claim 10, wherein said console includes means for selectively identifying any one of said plurality of seat belt mechanisms.

12. A control system according to claim 10, wherein said switching means includes means for simultaneously selectively locking and unlocking all of said plurality of seat belt mechanisms.

13. A control system according to claim 10, wherein said seat belt mechanism includes a male and a female restraint portion, said male and female seat restraint portions of the associated seat belt mechanism being keyed to only latch with each other.

14. A method of restraining a passenger by use of a seat restraint mechanism comprising the steps of:
    providing male and female seat belt components having one of a first latched and locked state, a second latched and unlocked state, and a third unlatched and unlocked state, an electrically operated lock and an electrically actuated switch to lock and unlock said seat belt components;
    requesting latching of said male and female seat belt components of a seat by an occupant of the seat;
    remotely detecting a status of said seat belt components; and,
    remotely actuating said electrically operated lock of latched seat belt components.

15. A method as defined in claim 14, further comprising the step of remotely exhibiting the detected status of said seat belt components.

16. A method as defined in claim 15, further comprising the step of remotely viewing the detected status of said seat belt components.

17. A method as defined in claim 14, further comprising the step of visually confirming the latched and locked state of said seat belt components of all occupied seats.

18. A method as defined in claim 14, further comprising the step of remotely detecting the passenger's request to unlock said seat belt components.

19. A method as defined in claim 18, further comprising the step of remotely displaying the passenger's request.

20. A method as defined in claim 19, further comprising the step of remotely and selectively unlocking the lock of the latched seat belt components.

21. A method as defined in claim 20, further comprising providing a plurality of seat belts and selectively controlling the locking and unlocking thereof.

22. A method as defined in claim 21, further comprising the step of selectively exempting the locking of a given one of the seat belts.

23. A method as defined in claim 21, further comprising the step of detecting changes in the status of seat belts and updating control console.

24. A method as defined in claim 23, further comprising the step of unlocking all seat restraints.

25. A control system for a plurality of passenger seat belt mechanisms comprising:

a control console, said control console includes a display and input screen for indicating a current state of said seat belt mechanism; and, said display and input screw including a seat belt touch screen control for selectively locking and unlocking an electrically activated lock in said seat belt mechanism.

26. A control system according to claim 25, wherein said current state of said seat belt mechanism being one of a first latched and locked state, a second latched and unlocked state, and a third unlatched and unlocked state.

27. A control system according to claim 25, further comprising a detector for signaling said current state of said seat belt mechanism.

28. A control system according to claim 25, wherein said control console is remote from said seat belt mechanisms.

29. A control system according to claim 25, wherein said display and input screen further includes a passenger identification portion for visually displaying passenger profile information.

30. A control system for a plurality of passenger seat belt mechanisms comprising:

a control console, said control console includes a display and input screen having a seat belt touch screen control adapted to send control signals to a processor; and, said processor programmed to output said control signals to an electrically activated lock in said seat belt mechanism for alternatively switching said lock between a locked and unlocked position in accordance with said control signals, whereby said locked position prohibits release of said seat belt mechanism.

31. A control system for a plurality of passenger seat belt mechanisms comprising:

a control console;

a detection mechanism to indicate a current state of at least one seat belt mechanism; and, a locking mechanism to remotely lock, unlock or combinations thereof said at least one seat belt mechanism.

* * * * *